(12) United States Patent
Tian et al.

(10) Patent No.: US 11,239,613 B2
(45) Date of Patent: Feb. 1, 2022

(54) POWER CORD AND HOME APPLIANCE PROVIDED WITH SAME

(71) Applicants: Guangdong Midea Kitchen Appliances Manufacturing Co., Ltd., Guangdong (CN); Midea Group Co., Ltd., Guangdong (CN)

(72) Inventors: Yun Tian, Guangdong (CN); Peilin Huang, Guangdong (CN); Guanghai Jin, Guangdong (CN); Qiong Hu, Guangdong (CN)

(73) Assignees: Guangdong Midea Kitchen Appliances Manufacturing Co., Ltd., Guangdong (CN); Midea Group Co., Ltd., Guangdong (CN)

( * ) Notice: Subject to any disclaimer, the term of this patent is extended or adjusted under 35 U.S.C. 154(b) by 0 days.

(21) Appl. No.: 16/652,396

(22) PCT Filed: Dec. 28, 2017

(86) PCT No.: PCT/CN2017/119512
§ 371 (c)(1),
(2) Date: Aug. 5, 2020

(87) PCT Pub. No.: WO2019/061917
PCT Pub. Date: Apr. 4, 2019

(65) Prior Publication Data
US 2020/0373712 A1 Nov. 26, 2020

(30) Foreign Application Priority Data
Sep. 30, 2017 (CN) .......................... 201710915303.X

(51) Int. Cl.
*H01R 13/66* (2006.01)
*H01R 13/74* (2006.01)

(52) U.S. Cl.
CPC ....... *H01R 13/6691* (2013.01); *H01R 13/743* (2013.01)

(58) Field of Classification Search
CPC .... H01R 13/46; H01R 13/447; H01R 13/516; H01R 13/58; H01R 13/5816; H01R 13/60;
(Continued)

(56) References Cited

U.S. PATENT DOCUMENTS 5,980,313 A * 11/1999 Kunishi ............... H01R 13/743
439/545
6,109,975 A * 8/2000 Nitta ..................... H01R 33/06
439/596
(Continued)

FOREIGN PATENT DOCUMENTS

| CN | 104545449 A | 4/2015 |
|---|---|---|
| CN | 205752886 U | 11/2016 |

(Continued)

*Primary Examiner* — Edwin A. Leon
*Assistant Examiner* — Matthew T Dzierzynski
(74) *Attorney, Agent, or Firm* — Seed IP Law Group LLP

(57) ABSTRACT

The present disclosure relates to the field of intelligent electrical appliances. Disclosed are a power cord (10) and a home appliance (20) provided with same. The power cord is used for supplying power to a home appliance, and is also used for mounting a communication module (300). The communication module is used for implementing wireless communication between the home appliance (20) and an external device. The power cord (10) comprises a line body (2), a plug (1) disposed at one end of the line body, a line body fixing portion (5) disposed on the part of the line body distant from the plug (1) and used for fixing the line body (2) on the home appliance, and an intelligent module mounting portion (S) disposed adjacent to the line body fixing portion (5) and disposed on the line body, wherein the intelligent module mounting portion (S) is provided with a base (100)

(Continued)

having an accommodation cavity (B) and a cover (200) matching the base (100) so as to enclose the accommodation cavity (B). The communication module (300) is accommodated in the accommodation cavity (B). The present power cord can stably mount an intelligent module, is convenient to use, and implements easy mounting and removal.

20 Claims, 3 Drawing Sheets

(58) Field of Classification Search
CPC ...... H01R 13/73; H01R 13/74; H01R 13/741; H01R 13/743; H01R 25/003; H01B 17/586
USPC .......................................................... 439/502
See application file for complete search history.

(56) References Cited

U.S. PATENT DOCUMENTS

| | | | |
|---|---|---|---|
| 6,238,242 B1* | 5/2001 | Hwang | ................ H01R 13/743 |
| | | | 439/545 |
| 6,875,052 B1* | 4/2005 | Lo | ........................... G06F 1/266 |
| | | | 439/545 |
| 7,338,297 B2* | 3/2008 | Maegawa | .............. H01R 13/73 |
| | | | 439/79 |
| 10,396,498 B2* | 8/2019 | Gassner | ............. H01R 13/6392 |

FOREIGN PATENT DOCUMENTS

| | | |
|---|---|---|
| CN | 106299904 A | 1/2017 |
| CN | 205921127 U | 2/2017 |
| CN | 205985620 U | 2/2017 |
| CN | 206076634 U | 4/2017 |
| CN | 106785710 A | 5/2017 |
| CN | 207474827 U | 6/2018 |

* cited by examiner

POWER CORD AND HOME APPLIANCE PROVIDED WITH SAME

FIELD OF THE DISCLOSURE

The present application relates to the field of intelligent electrical appliances, particularly to a power cord and a home appliance provided with the power cord.

BACKGROUND OF THE DISCLOSURE

With the development and the progress of science and technology, the application of intelligent products has become a trend. It is more and more common that a control system interacts with a home appliance by a wired or wireless means and thereby controls the operation of the home appliance. Presently, a home appliance is rendered with a wireless receiving and transmitting function by adding an intelligent module (or a communication module) in the main body of the home appliance. The intelligent module is usually mounted inside or outside the home appliance. Mounting the intelligent module outside the home appliance has an adverse effect to the appearance, while mounting the intelligent module inside the home appliance leads to electromagnetic interference of the electrical components inside the home appliance as the intelligent module receiving and transmitting signal and degrade reliability of the interactive communication.

In the prior art, an intelligent module mounting structure as shown in FIG. 1 exists. Specifically, as shown in FIG. 1, a clearance boss 5.1 is arranged on the line body fixing portion 5 of a power cord, and a groove is arranged in the clearance boss 5.1 to accommodate an intelligent module 3. In such a mounting structure, the intelligent module 3 is not mounted firmly and stably in the grooved if the size of the intelligent module 3 is too small; and it will be difficult to remove the intelligent module 3 after the intelligent module 3 is mounted if the size of the intelligent module 3 is too large. In another mounting structure, the intelligent module 3 is clamped between the power cord and the clearance boss 5.1, and then is fixed by fitting a fixing sleeve from outside. However, the mounting and removing operations are complex in that mounting structure.

SUMMARY OF THE DISCLOSURE

The object of the present disclosure is to provide a power cord on which a communication module can be mounted firmly and stably and can be removed simply. To solve, among others, the above-mentioned technical problem, according to one aspect of the present disclosure, a power cord is provided. The power cord is used for supplying power to a home appliance, and is also used for mounting a communication module. The communication module is used for implementing wireless communication between the home appliance and an external device. The power cord comprises: a line body, a plug disposed at one end of the line body, a line body fixing portion disposed on a part of the line body distal from the plug and used for fixing the line body on the home appliance, and an intelligent module mounting portion disposed on the line body adjacent to the line body fixing portion; wherein the intelligent module mounting portion is provided with a base having an accommodation cavity and a cover fitted with the base so as to enclose the accommodation cavity, and the communication module is accommodated in the accommodation cavity.

Optionally, the base comprises a bottom wall and four side walls, and the accommodation cavity is enclosed by the bottom wall and the four side walls. Optionally, a wire notch for passing through a lead wire that connect the communication module to the home appliance is formed in the side wall of the base adjacent to the line body fixing portion.

Optionally, a restricting slot in which the lead wires can be embedded is formed in the part of the bottom wall adjacent to the wire notch.

Optionally, the restricting slot extends from the wire notch to the central area of the bottom wall. Optionally, the line body fixing portion comprises two end faces and a snap-fit groove formed between the two end faces, and the side wall of the base adjacent to the line body fixing portion and the end face of the line body fixing portion adjacent to the base are of the same structure.

Optionally a wire notch for passing through a lead wire that connect the communication module to the home appliance is formed in the other end face of the line body fixing portion distal from the base.

Optionally the cover is removably mounted on the base; or the cover is rotatably connected to the base.

Optionally the cover is rotatably connected with respect to the base at the side wall distal from the wire notch, and the cover is hinged to the base at the side wall opposite to the side wall with the wire notch; snap-fit structures that can be snap-fitted to each other are provided on the cover and the side wall of the base adjacent to the wire notch.

Optionally a mounting hole through which the line body may pass is formed in the bottom of the base.

According to another aspect of the present disclosure, a home appliance is provided. The home appliance comprises a housing, a communication module, a back plate assembled with the housing, and the above-mentioned power cord; the line body fixing portion is fixed on the back plate, and the communication module is accommodated in the accommodation cavity and extends out of the housing. Optionally a mounting hole is formed on the back plate; the line body fixing portion comprises two end faces and a snap-fit groove formed between the two end faces; the power cord is snap-fitted in the mounting hole via the snap-fit groove.

With the technical scheme provided in the present disclosure, an intelligent module can be mounted firmly and stably, and is convenient to use and easy to mount and remove.

Other features and advantages of the present disclosure will be further detailed in the embodiments hereunder.

Figure 1:
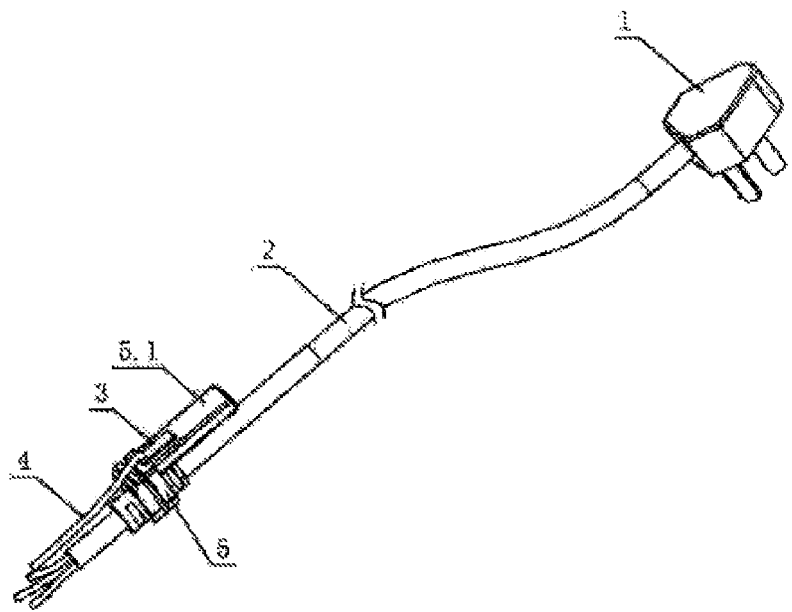
FIG. 1 is a schematic structural view of the power cord according to an embodiment in the prior art.

| Reference Numbers: | |
|---|---|
| 1 plug | 2 line body |
| 3 intelligent module | 5 line body fixing portion |
| 5.1 clearance boss | 10 power cord |
| 20 home appliance | S intelligent module mounting portion |
| 21 housing | 22 back plate |
| 220 mounting hole | B accommodation cavity |
| 100 base | 100' bottom wall |
| 100a first side wall | 100b second side wall |
| 100c third side wall | 100d fourth side wall |
| 101 wire notch | 102 restricting slot |
| 101b wire notch | 103 mounting groove |
| 200 cover | 300 communication module |
| 302 lead wire | 501 a first end face |
| 501b second end face | 600 snap fit grove |

DETAILED DESCRIPTION OF THE EMBODIMENTS

Hereunder some embodiments of the present disclosure will be detailed with reference to the accompanying drawings. It should be understood that the embodiments described here are only provided to describe and explain the present disclosure rather than constitute any limitation to the present disclosure.

In the present disclosure, unless otherwise specified, the words that denote directions or orientations, such as "above", "below", "top", and "bottom", etc., are usually used to describe the relative position relations among the components with respect to the direction shown in the accompanying drawings or the vertical, plumb, or gravity direction; "vertical direction" refers to the up-down direction of the paper surface of the drawing; "inside" and "outside" usually refer to inside and outside of a cavity with respect to the cavity or inside and outside in the radial direction with respect to the center of a circle.

Figure 2:
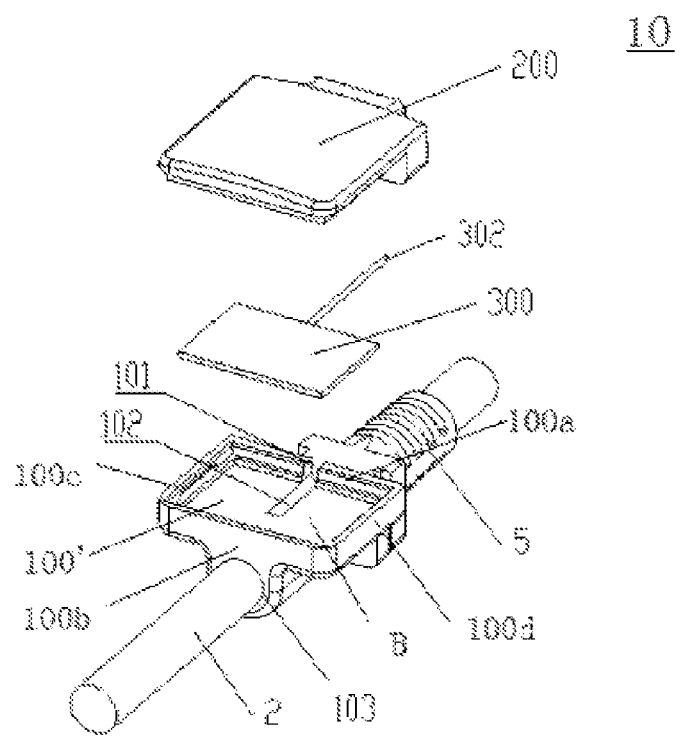
FIG. 2 is a schematic structural view of the power cord according to a first embodiment of the present disclosure.

As shown in FIG. 2, the disclosure provides a power cord 10, which is used for supplying power to a home appliance 20 and is also used for mounting a communication module 300. The communication module 300 is used for implementing wireless communication between the home appliance 20 and an external device. The power cord 10 comprises: a line body 2, a plug 1 disposed at one end of the line body 2, a line body fixing portion 5 disposed on a part of the line body 2 distal from the plug 1 and used for fixing the line body 2 on the home appliance, and an intelligent module mounting portion S disposed adjacent to the line body fixing portion 5 on the line body 2. The intelligent module mounting portion S is provided with a base 100 having an accommodation cavity B and a cover 200 fitted with the base 100 so as to enclose the accommodation cavity B, and the communication module 300 is accommodated in the accommodation cavity B. During assembling, the main part of the communication module 300 may be embedded in the accommodation cavity B of the base 100, the cover 200 is fitted on the base 100 to encapsulate the main part of the communication module 300, and lead wire 302 of the communication module 300 extend out of the base 100.

Here, it should be noted that the communication module 300 comprises an antenna and a signal processing module that has a signal processing function. Optionally, the communication module 300 is a planar antenna, and the signal processing module is integrated in a control board for the home appliance.

Optionally, as shown in FIG. 2, the base 100 comprises a bottom wall 100' and four side walls 100a, 100b, 100c and 100d, and the accommodation cavity B is enclosed by the bottom wall 100' and the four side walls 100a, 100b, 100c and 100d. A wire notch 101 allowing the lead wire 302 that connect the communication module to the home appliance to pass through is formed in the side wall 100a of the base 100 adjacent to the line body fixing portion 5. A restricting slot 102 in which the lead wires 302 can be embedded is formed in the part of the bottom wall 100' adjacent to the wire notch 101. In such a case, if the main part of the communication module 300 matches the accommodation cavity B of the base 100 in size, the lead wire 302 of the communication module may directly extend horizontally from the wire notch 101 to the outside of the base 100. If the size of the main body part of the communication module 300 is smaller than the size of the base 100, the lead wire 302 of the communication module 300 may firstly extend to the wire notch 101 restricted and guided by the restricting slot 102 and then extend out of the base 100. Thus, regardless of the size of the communication module 300, the cover 200, the wire notch 101 and the restricting slot 102 can jointly restrict the lead wire 302 of the communication module within a certain movement space, so that the lead wire 302 of the communication module doesn't pull the main part of the communication module upward, and thereby the mounting stability and firmness of the communication module 300 on the power cord is improved.

In the above embodiment, a mounting hole 103 allowing the line body 2 to pass through is formed in the bottom of the mounting base 100.

In order to ensure certain movement allowance for the lead wire 302 of the communication module, the restricting slot 102 extends from the wire notch 101 to the central area of the bottom wall 100'. In such a case, the lead wire 302 of the communication module may be flexed downward along the restricting slot 102 to a certain angle. Besides, the downward flexing of the lead wire 302 of the communication module has no impact on the mounting firmness and stability of the entire communication module 300 in the base 100. Optionally, the communication module 300 comprises a wireless communication element. More optionally, the wireless communication element is a WIFI antenna.

Figure 3:
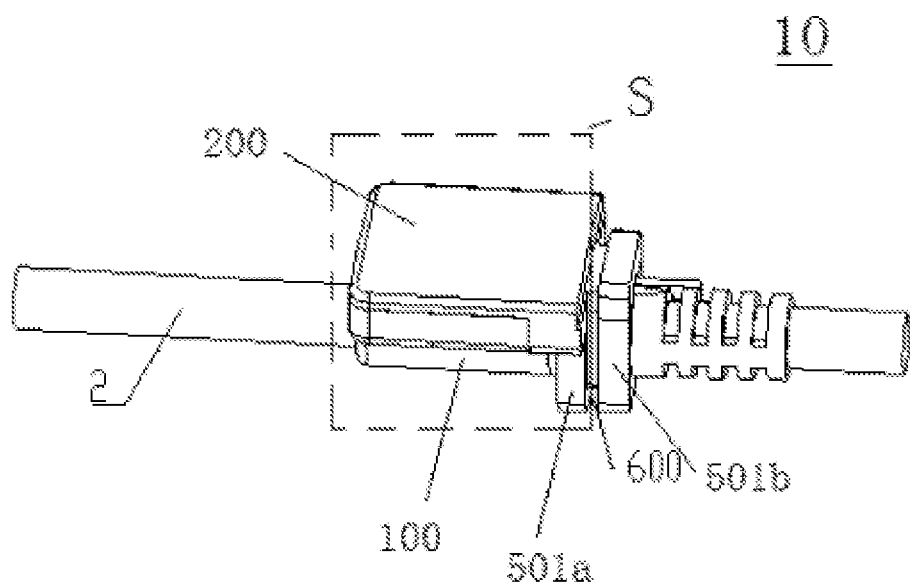
FIG. 3 is a front view of the power cord in FIG. 2.
Figure 4:
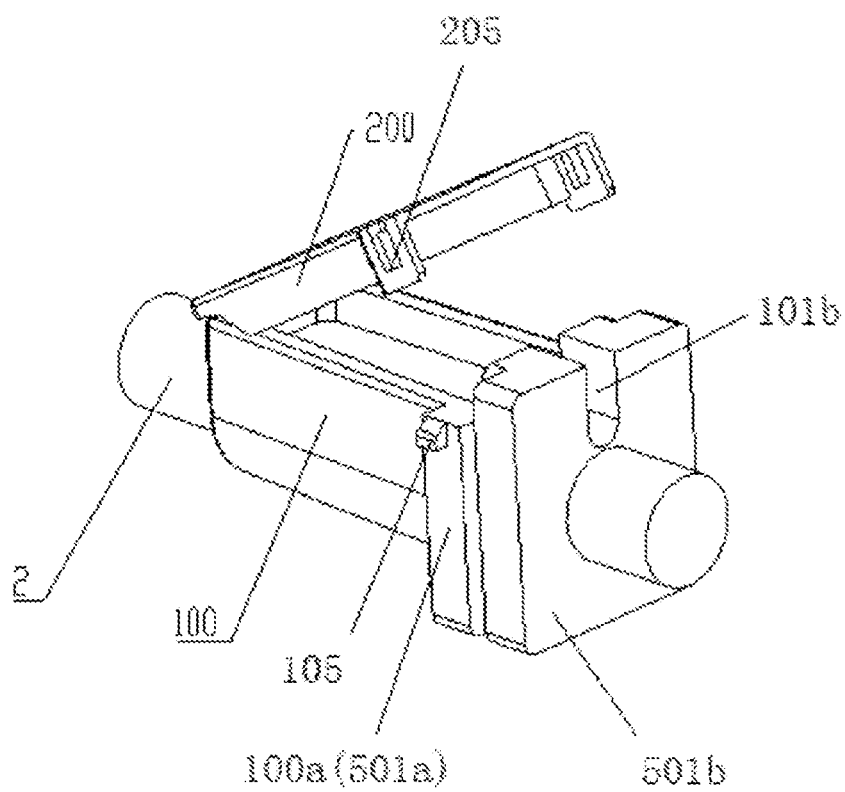
FIG. 4 is a schematic structural view of the power cord according to a second embodiment of the present disclosure.

In addition, in order to facilitate the mounting of the communication module 300 on other electrical appliances, as shown in FIG. 3 and FIG. 4, the line body fixing portion 5 comprises two end faces 501a and 501b and a snap-fit groove 600 formed between the two end faces 501a and 501b. The side wall 100a of the base 100 adjacent to the line body fixing portion 5 and the end face 501a of the line body fixing portion 5 adjacent to the base 100 are of the same structure. Optionally, a wire notch 101b for passing through the lead wire 302 that connect the communication module 300 to the home appliance is formed in the other end face 501b of the line body fixing portion 5 distal from the base 100. In such a case, the communication module 300 may be fixed together with the line body fixing portion 5 of the power cord to the casing of the electrical appliance by means of the snap-fit groove 600.

The wire notch 101b is formed in the side wall of the base 100 that defines the snap-fit groove 600. In such a case, the lead wire 302 of the communication module is in the same extension direction as the line body 2 of the power cord, i.e., the lead wire 302 of the communication module runs parallel to the line body 2. Thus, crossing or intertwining and interference between the power cord and the lead wire 302 of the communication module can be prevented, and the power cord and the lead wire 302 of the communication module can be respectively connected conveniently.

As shown in FIG. 2 and FIG. 4, the cover 200 may be removably mounted on the base 100 or rotatably connected to the base 100. Specifically, in a case that the cover 200 is rotatably connected to the base 100, snap-fit structures 105, 205 that can be snap-fitted together are provided on the cover 200 and the side wall 100a of the base 100 adjacent to the wire notch 101. In such a case, after the communication module 300 is mounted, the cover 200 may be placed over the communication module 300 and further clamp the lead wire 302 of the communication module.

Figure 5:
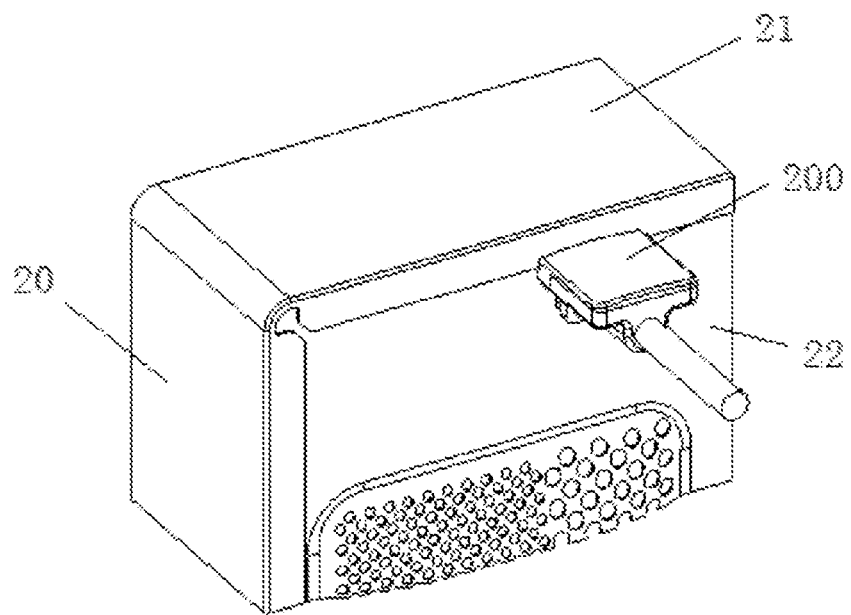
FIG. 5 is a schematic structural view of a home appliance provided with the power cord according to the present disclosure.
Figure 6:
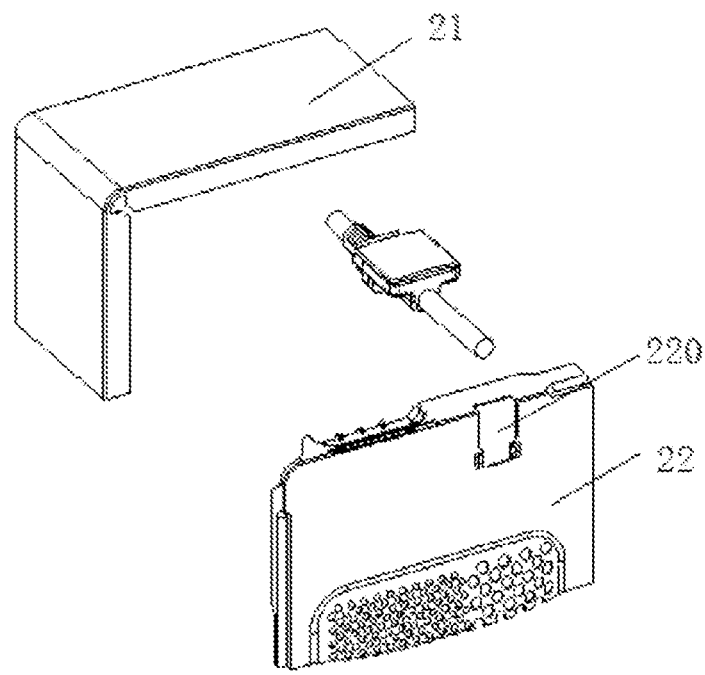
FIG. 6 is a schematic view showing the assembling relationship between the power cord and the home appliance.

The present disclosure further provides a home appliance. As shown in FIG. 5 and FIG. 6, the home appliance comprises a housing 21, a communication module 300, a back plate 22 assembled with the housing 21, and the above-mentioned power cord 10. The line body fixing portion 5 is fixed on the back plate 22, and the communication module 300 is accommodated in the accommodation cavity B of the base 100 and extends out of the housing 21. Optionally, a mounting hole 220 is formed in the back plate 22, and the line body fixing portion 5 comprises two end faces 501a, 501b and a snap-fit groove 600 formed between the two end faces 501a, 501b. The power cord 10 is snap-fitted in the mounting hole 220 via the snap-fit groove 600. In such a case, by disposing the communication module 300 at the line body fixing portion 5 of the power cord 10 skillfully, the communication module 300 may be directly disposed on the back plate 22 of the home appliance 20, rather than being disposed inside or outside the home appliance 20. In that way, the home appliance 20 can communicate with other electrical appliances, the communication module 300 has no adverse effect to the esthetic appearance of the home appliance 20, and the signals of the communication module 300 are not subject to electromagnetic interference of the electronic elements in the home appliance 20.

Furthermore, as shown in FIG. 6, a mounting hole 220 is formed in the top area of the back plate 22. When the communication module 300 is to be replaced, the housing 21 may be removed from the back plate 22 first, and then the line body fixing portion 5 of the power cord may be taken out from the mounting hole 220, and the cover 200 may be opened, so that the communication module 300 in the base 100 may be replaced. It should be noted that the home appliance 20 in the present disclosure may be any kind of intelligent home appliance that needs the power cord 10, such as refrigerator, washing machine, air conditioner, etc. Optionally, the home appliance 20 in the present disclosure is a microwave oven or baking oven.

While the present disclosure is described above in detail in some preferred embodiments with reference to the accompanying drawings, the present disclosure is not limited to those embodiments. Various simple variations may be made to the technical scheme in the present disclosure, including combinations of the specific technical features in any appropriate form, within the scope of the technical ideal of the present disclosure. To avoid unnecessary repetition, the possible combinations are not described specifically in the present disclosure. However, such simple variations and combinations shall also be deemed as having been disclosed and falling in the scope of protection of the present disclosure.

The invention claimed is:

1. A power cord comprising:
 a line body;
 a plug disposed at a first end of the line body;
 a line body fixing portion disposed on a part of the line body distal from the plug, the line body fixing portion configured to fix the line body on a home appliance;
 an intelligent module mounting portion disposed on the line body adjacent to the line body fixing portion, the intelligent module mounting portion including:
  a base having an accommodation cavity, and
  a cover fitted with the base and configured to enclose the accommodation cavity; and
 a communication module accommodated in the accommodation cavity,
 wherein the base comprises a bottom wall and four side walls, and the accommodation cavity is enclosed by the bottom wall and the four side walls;
 wherein the line body fixing portion comprises two end faces and a snap-fit groove between the two end faces, and a side wall of the base adjacent to the line body fixing portion and a first end face of the two end faces adjacent to the base are parts of a monolithic structure; and
 wherein a second end face of the two end faces includes a wire notch for passing through a lead wire that connects the communication module to the home appliance, the second end face distal from the base.

2. The power cord of claim 1, wherein the base includes a wire notch for passing through a lead wire that connects the communication module to the home appliance, the wire notch being positioned in a side wall of the base that is adjacent to the line body fixing portion.

3. The power cord of claim 2, wherein the base includes a restricting slot, in which the lead wires can be embedded, the restriction slot being positioned in a part of the bottom wall adjacent to the wire notch.

4. The power cord of claim 3, wherein the restricting slot extends from the wire notch to a central area of the bottom wall.

5. The power cord of claim 2, wherein the cover is rotatably coupled with respect to the base at a side wall of the four side walls that is distal from the wire notch, and
 wherein the power cord further comprises snap-fit structures configured to snap fit to one another, the snap-fit structures positioned on the cover and a side wall of the four side walls that is adjacent to the wire notch.

6. The power cord of claim 1, wherein the cover is one or more of:
 removably mounted on the base; or
 rotatably coupled to the base.

7. The power cord of claim 1, wherein the base includes a mounting hole, through which the line body passes, in a bottom of the base.

8. A home appliance, comprising a housing, a communication module, a back plate assembled with the housing, and a power cord, the power cord including:
 a line body;
 a plug disposed at a first end of the line body;
 a line body fixing portion disposed on a part of the line body distal from the plug; and
 an intelligent module mounting portion disposed on the line body adjacent to the line body fixing portion, the intelligent module mounting portion including:
  a base having an accommodation cavity, and
  a cover fitted with the base and configured to enclose the accommodation cavity;
 wherein the line body fixing portion is fixed on the back plate, and the communication module is accommodated in the accommodation cavity and extends out of the housing;

wherein the base comprises a bottom wall and four side walls, and the accommodation cavity is enclosed by the bottom wall and the four side walls, wherein the line body fixing portion comprises two end faces and a snap-fit groove between the two end faces, and a side wall of the base adjacent to the line body fixing portion and a first end face of the two end faces adjacent to the base are parts of a monolithic structure; and wherein a second end face of the two end faces includes a wire notch for passing through a lead wire that connects the communication module to the home appliance, the second end face distal from the base.

9. The home appliance of claim 8, wherein the back plate includes a mounting hole; the line body fixing portion comprises two end faces and a snap-fit groove between the two end faces; and the power cord is snap-fitted in the mounting hole via the snap-fit groove.

10. The home appliance of claim 8, wherein the base includes a wire notch for passing through a lead wire that connects the communication module to the home appliance, the wire notch being positioned in a side wall of the base that is adjacent to the line body fixing portion.

11. The home appliance of claim 10, wherein the base includes a restricting slot, in which the lead wires can be embedded, the restriction slot being positioned in a part of the bottom wall adjacent to the wire notch.

12. The home appliance of claim 11, wherein the restricting slot extends from the wire notch to a central area of the bottom wall.

13. The home appliance of claim 8, wherein the cover is one or more of:
removably mounted on the base; or
rotatably coupled to the base.

14. The home appliance of claim 8, wherein the base includes a mounting hole, through which the line body passes, in a bottom of the base.

15. A home appliance, comprising
a body; and
a power cord coupled to the body, the power cord including:
a line body;
a plug disposed at a first end of the line body;
a line body fixing portion disposed on a part of the line body distal from the plug, the line body fixing portion configured to fix the line body on the body;
an intelligent module mounting portion disposed on the line body adjacent to the line body fixing portion, the intelligent module mounting portion including:
a base having an accommodation cavity, and
a cover fitted with the base and configured to enclose the accommodation cavity; and
a communication module accommodated in the accommodation cavity, wherein the base comprises a bottom wall and four side walls, and the accommodation cavity is enclosed by the bottom wall and the four side walls;

wherein the line body fixing portion comprises two end faces and a snap-fit groove between the two end faces, and a side wall of the base adjacent to the line body fixing portion and a first end face of the two end faces adjacent to the base are parts of a monolithic structure; and wherein a second end face of the two end faces includes a wire notch for passing through a lead wire that connects the communication module to the home appliance, the second end face distal from the base.

16. The home appliance of claim 15, wherein the base includes a wire notch for passing through a lead wire that connects the communication module to the home appliance, the wire notch being positioned in a side wall of the base that is adjacent to the line body fixing portion.

17. The home appliance of claim 16, wherein the base includes a restricting slot, in which the lead wires can be embedded, the restriction slot being positioned in a part of the bottom wall adjacent to the wire notch.

18. The home appliance of claim 17, wherein the restricting slot extends from the wire notch to a central area of the bottom wall.

19. The home appliance of claim 15, wherein the cover is one or more of:
removably mounted on the base; or
rotatably coupled to the base.

20. The home appliance of claim 15, wherein the base includes a mounting hole, through which the line body passes, in a bottom of the base.

* * * * *